(12) United States Patent
Gordon et al.

(10) Patent No.: US 10,819,132 B2
(45) Date of Patent: Oct. 27, 2020

(54) DEVICE WITH BATTERY CHARGER SYSTEM AND ENGINE START SYSTEM FORMED FROM HIGH FREQUENCY TRANSFORMERS

(71) Applicants: Lawrence W. Gordon, Lake Helen, FL (US); Max W. Saelzer, Oviedo, FL (US)

(72) Inventors: Lawrence W. Gordon, Lake Helen, FL (US); Max W. Saelzer, Oviedo, FL (US)

(73) Assignee: DELTRAN OPERATIONS USA, INC., Deland, FL (US)

( * ) Notice: Subject to any disclaimer, the term of this patent is extended or adjusted under 35 U.S.C. 154(b) by 74 days.

(21) Appl. No.: 15/669,221

(22) Filed: Aug. 4, 2017

(65) Prior Publication Data
US 2019/0044359 A1 Feb. 7, 2019

(51) Int. Cl.
*H02J 7/00* (2006.01)
*H02J 7/02* (2016.01)
(Continued)

(52) U.S. Cl.
CPC ........ *H02J 7/0068* (2013.01); *F02N 11/0862* (2013.01); *H02J 7/007* (2013.01); *H02J 7/345* (2013.01)

(58) Field of Classification Search
USPC ...................................... 307/10.6, 10.1, 9.1
See application file for complete search history.

(56) References Cited

U.S. PATENT DOCUMENTS

| 3,165,689 A | 1/1965 | Hughes |
| 5,083,076 A | 1/1992 | Scott |

(Continued)

FOREIGN PATENT DOCUMENTS

| CN | 104393356 | 3/2015 |
| CN | 205178537 | 4/2016 |

(Continued)

OTHER PUBLICATIONS

World Intellectual Property Organization, "International Search Report and Written Opinion," issued in PCT Application No. PCT/US2018/044920, by U.S. International Search Authority, dated Oct. 11, 2018, document of 10 pages.

(Continued)

*Primary Examiner* — Rexford N Barnie
*Assistant Examiner* — Xuan Ly
(74) *Attorney, Agent, or Firm* — Akerman LLP; Michael K. Dixon

(57) ABSTRACT

A high frequency battery charging device including a battery charger system and an engine start system is disclosed. In at least one embodiment, the high frequency battery charging device may include a battery charger system formed from a first high frequency transformer configured to charge a battery, and may include an engine start system formed from a second high frequency transformer configured to charge a supercapacitor bank, which in turn is configured to start and engine coupled to a battery. The high frequency battery charging device may be configured to be coupled to a battery. In at least one embodiment, the high frequency battery charging device may be configured to be coupled to a battery positioned within a vehicle. The high frequency battery charging device may be coupled to the battery with the high frequency battery charging device being positioned outside of the battery.

18 Claims, 3 Drawing Sheets

(51) Int. Cl.
*H02J 7/04* (2006.01)
*F02N 11/08* (2006.01)
*H02J 7/34* (2006.01)

(56) References Cited

U.S. PATENT DOCUMENTS

| | | | |
|---|---|---|---|
| 5,157,267 A | 10/1992 | Shirata et al. | |
| 5,260,637 A | 11/1993 | Pizzi | |
| 5,637,978 A | 6/1997 | Kellett et al. | |
| 5,793,185 A | 8/1998 | Prelec et al. | |
| 5,798,630 A | 8/1998 | Sugimori et al. | |
| 6,222,342 B1 | 4/2001 | Eggert et al. | |
| 6,384,573 B1 | 5/2002 | Dunn | |
| 6,679,212 B2 | 1/2004 | Kelling | |
| 6,788,025 B2 | 9/2004 | Bertness et al. | |
| 6,819,010 B2 | 11/2004 | Burke | |
| 6,988,475 B2 | 1/2006 | Burke | |
| 7,015,674 B2 | 3/2006 | Vonderhaar | |
| 7,319,306 B1 | 1/2008 | Rydman et al. | |
| 7,806,095 B2 | 10/2010 | Cook et al. | |
| 7,963,264 B2 | 6/2011 | Reynolds | |
| 8,134,343 B2 | 3/2012 | Like et al. | |
| 9,174,525 B2 | 11/2015 | Caron | |
| 9,194,357 B2 | 11/2015 | Huang | |
| 9,242,570 B2 | 1/2016 | Kim et al. | |
| 9,300,018 B2 | 3/2016 | Watson et al. | |
| 9,368,269 B2 | 6/2016 | Chen et al. | |
| 9,397,513 B2 | 7/2016 | Butler et al. | |
| 2003/0141845 A1* | 7/2003 | Krieger | H02J 7/0054 320/132 |
| 2007/0252559 A1 | 11/2007 | Uhl | |
| 2010/0039065 A1 | 2/2010 | Kinkade | |
| 2012/0104861 A1* | 5/2012 | Kojori | H01M 10/46 307/82 |
| 2012/0248870 A1 | 10/2012 | Coleman et al. | |
| 2015/0028796 A1 | 1/2015 | Nakayama et al. | |
| 2015/0102781 A1 | 4/2015 | Inskeep | |
| 2016/0243960 A1 | 8/2016 | Wood et al. | |
| 2016/0268058 A1 | 9/2016 | Postiglione | |
| 2016/0329731 A1 | 11/2016 | Kokot et al. | |
| 2016/0380441 A1 | 12/2016 | Groat et al. | |
| 2017/0066342 A1* | 3/2017 | Butler | H02J 7/0004 |
| 2018/0372054 A1* | 12/2018 | Chen | H02J 7/0021 |

FOREIGN PATENT DOCUMENTS

| | | |
|---|---|---|
| EP | 1471545 | 1/2006 |
| EP | 2816221 | 12/2014 |
| WO | 2010093186 | 12/2010 |
| WO | 2012176942 | 12/2012 |
| WO | 2013138380 | 3/2014 |
| WO | 2014142759 | 9/2014 |
| WO | 2016161687 | 10/2016 |
| WO | 2016193803 | 12/2016 |

OTHER PUBLICATIONS

Zoro, "Ultracapacitor Jump Starter, 800A, 12VDC," Accessed Jan. 2017, https://www.zoro.com/dsr-proseries-ultracapacitor-jump-starter-800a-12vdc-dsr109 /i/G3983406/.

Oil & Gas Product News, "Super Capacitor Fast Start Technology Eliminates Downtime from Dead Batteries," Sep. 18, 2015, http://www.oilandgasproductnews.com/article/21566/super-capacitor-fast-starttechnology-eliminates-downtime-from-dead-batteries.

Kold Ban Industries, "Jump Starters," koldban.com, Sep. 10, 2012, http://web.archive.org/web/20120910043146/http://www.koldban.com/KBi_KrankingKARTS_s/5.htm.

Electro Boom, "Jump Start a Car with Super Capacitors," electroboom.com, Jun. 14, 2016, http://www.electroboom.com/?p=824.

Jaycar Electronics, "Capacitor Based 12V 300A Jump Starter," jaycar.us, Cat.No. MB3765, 2016, https://www.jaycar.us/capacitor-based-12v-300a-jump-starter/p/MB3765.

Truck Parts & Service, "Portable heavy-duty jump starter," truckpartsandservice.com, Feb. 27, 2016. http://www.truckpartsandservice.com/portable-heavy-duty-jump-starter/.

John Deere, "DSR Battery Jump Starters," jdparts.deere.com, 2016, https://jdparts.deere.com/partsmkt/document/english/pmac/57646_DSRChargers.htm.

Maxwell® Technologies, "Maxwell's ultracapacitor-based Engine Start Module," maxwell.com, Feb. 24, 2012, http://web.archive.org/web/20120224034130/http://www.maxwell.com/products/ultracapacitors/products/engine-start-module.

Park, "Say Goodbye to Booster Cables," HDT—Heavy Duty Trucking, truckinginfo.com, Jun. 2013. http://www.truckinginfo.com/article/story/2013/06/say-goodbye-to-boostercables.aspx.

Amazon, "coolestore® 16V 83F Ultracapacitor Engine Battery Start Booster Car Ultra/Super Capacitor," amazon.com, ASIN: B00PU4J7GY, Nov. 19, 2014, https://www.amazon.com/coolestore%C2%AE-Ultracapacitor-Battery-Starter-Capacitor/dp/B00PU4J7GY.

* cited by examiner

DEVICE WITH BATTERY CHARGER SYSTEM AND ENGINE START SYSTEM FORMED FROM HIGH FREQUENCY TRANSFORMERS

FIELD OF THE INVENTION

The invention relates to battery chargers, and more particularly, to high efficiency battery chargers.

BACKGROUND

Currently, there exist dual-mode battery chargers to charge batteries and provide boost power. When operated in a first mode, the battery charger is configured to charge a battery back to full charge. In a second mode, the battery charger provides a high current can be used to jump-start a vehicle with a dead battery. Conventional battery chargers often use a single large transformer to power both of these modes. The single transformer is usually a linear type transformer, which is often cost-efficient and effective, but is large and cumbersome. Additionally, the linear transformer can only provide a high current output for a short time without generating an excessive amount of heat which risks melting components of the battery charger. Linear transformers are also inefficient in terms of copper and core losses. Thus, a need exists for a more efficient dual-mode battery charger.

SUMMARY OF THE INVENTION

A high frequency battery charging device including a battery charger system and an engine start system is disclosed. In at least one embodiment, the high frequency battery charging device may include a battery charger system formed from a first high frequency transformer configured to charge a battery, and may include an engine start system formed from a second high frequency transformer configured to charge a supercapacitor bank, which in turn is configured to start an engine coupled to a battery. The high frequency battery charging device may be configured to be coupled to a battery. In at least one embodiment, the high frequency battery charging device may be configured to be coupled to a battery positioned within a vehicle, such as, but not limited to being an automobile, vessel, airplane, all-terrain vehicle, utility vehicle, personal watercraft and the like. The high frequency battery charging device may be coupled to the battery with the high frequency battery charging device being positioned outside of the battery.

In at least one embodiment, the high frequency battery charging device may be formed from a first high frequency transformer configured to charge a battery and a second high frequency transformer configured to charge a supercapacitor bank. The supercapacitor bank may be in communication with the second high frequency transformer and configured to provide an engine start function to an engine coupled to a battery to which the high frequency battery charging device is coupled. The high frequency battery charging device may be configured to be coupled to a battery.

In at least one embodiment, the first high frequency transformer may be configured to charge a 12 volt vehicle battery. The first high frequency transformer and the second high frequency transformer may be configured to operate at the same frequency. The high frequency battery charging device may include a function select circuit configured to direct power from the first high frequency transformer, which is a battery charger system, or the second high frequency transformer, which is an engine start system, to the battery. The high frequency battery charging device may include a power input circuit configured to rectify and filter incoming alternating current power to direct current power to supply to the first and second high frequency transformers. The high frequency battery charging device may also include a rectifier filter circuit positioned downstream from and in communication with the first high frequency transformer and upstream from and in communication with a function select circuit for converting direct current power emitted from the first high frequency transformer as alternating current power to direct current power to be supplied to the battery via the function select circuit. The high frequency battery charging device may also include a rectifier filter circuit positioned downstream from and in communication with the second high frequency transformer and upstream from and in communication with the supercapacitor bank and a function select circuit configured to receive direct current power from the supercapacitor bank and directing the direct current power to the battery. The rectifier filter circuit may receive alternating current power from the second high frequency transformer, convert the alternating current power to direct current power and pass the direct current power to the supercapacitor bank. A function select circuit may be positioned downstream of the supercapacitor bank for directing direct current power emitted from the supercapacitor bank to the battery via the function select circuit.

The high frequency battery charging device may include a control circuit configured to control operation of a battery charger system, an engine start system and the function select circuit. The control circuit may be programmable. The high frequency battery charging device may also include a graphical user interface configured to enable a user to control the device. The graphical user interface may be configured such that a user may select a mode of operation. The graphical user interface may be used to provide visual feedback to the user.

An advantage of the device is that supercapacitors exhibit little wear and tear by cycling.

Another advantage of the device is that supercapacitors can be used nearly an unlimited number of cycles without performance degradation.

Yet another advantage of the device is that, if chosen correctly with the right output circuitry, the current provided by supercapacitors to assist an engine start can be very high and sustained for a long time without causing too much stress on the electrical components.

Another advantage of the device is that the current delivered to the battery by the supercapacitor bank is direct current which minimizes heat developed by components and the battery as compared to conventional systems.

Still another advantage of the device is that the high frequency battery charging device does not use linear transformers for engine start and thus does not suffer from increased heat dissipation by components and the battery caused by a current with a high peak to average ratio as found in linear transformers.

Another advantage of the device is that a high frequency transformer used to charge a supercapacitor bank can effectively be chosen to work at a fixed frequency, which reduces radiated and conductive EMI as compared to conventional systems.

These and other embodiments are described in more detail below.

DETAILED DESCRIPTION OF THE FIGURES

Figure 1:
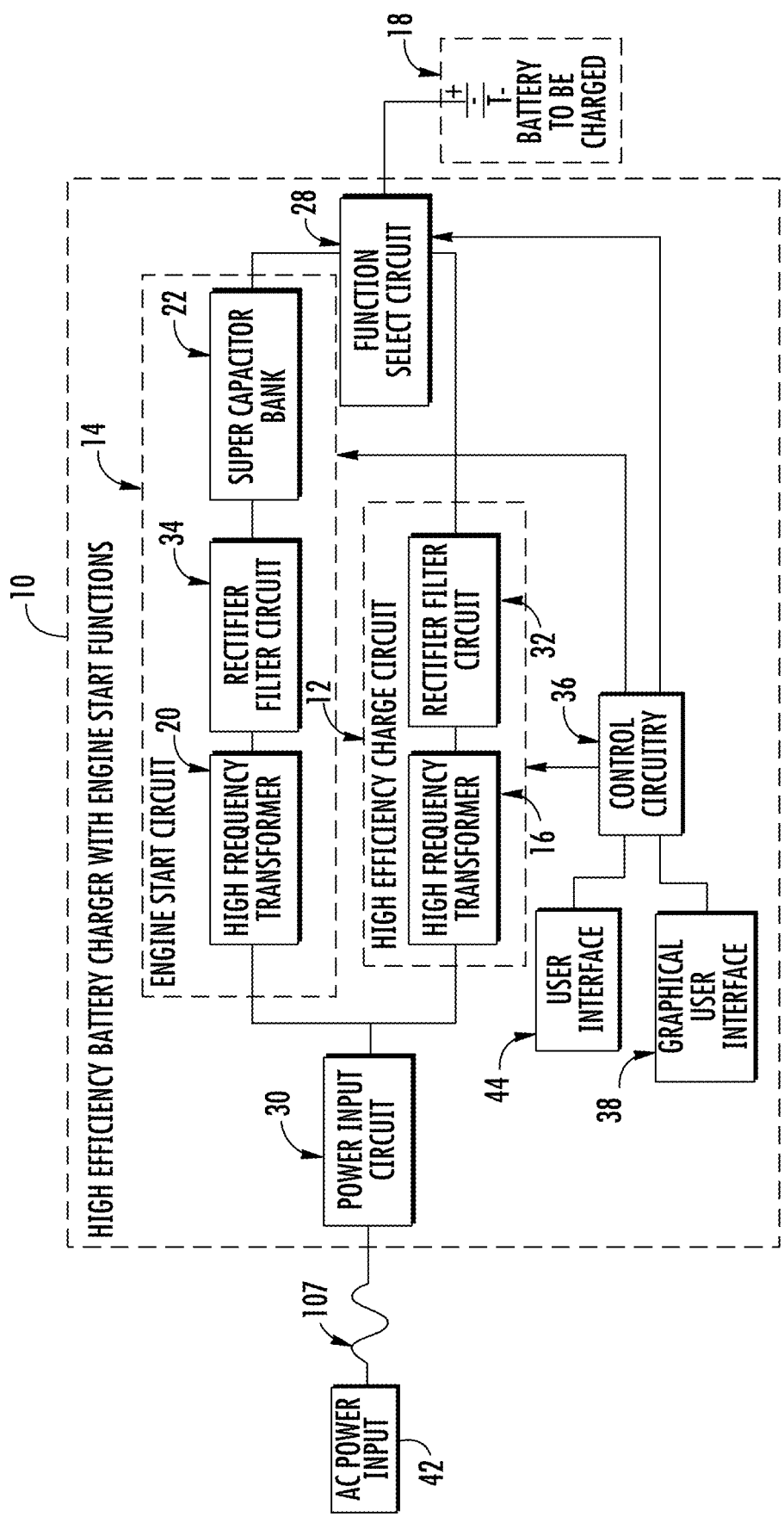
FIG. 1 is a schematic diagram of the high frequency battery charging device.
Figure 2:
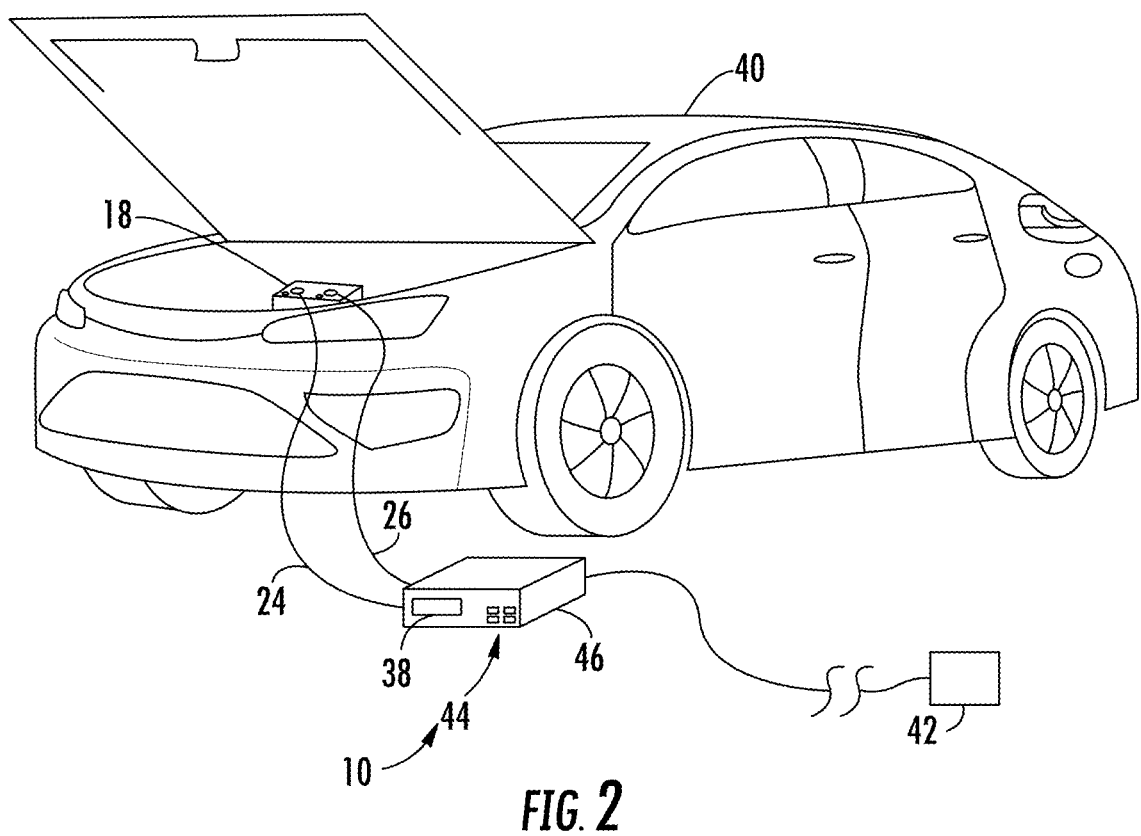
FIG. 2 is a perspective view of high frequency battery charging device coupled to a battery in a vehicle.
Figure 3:
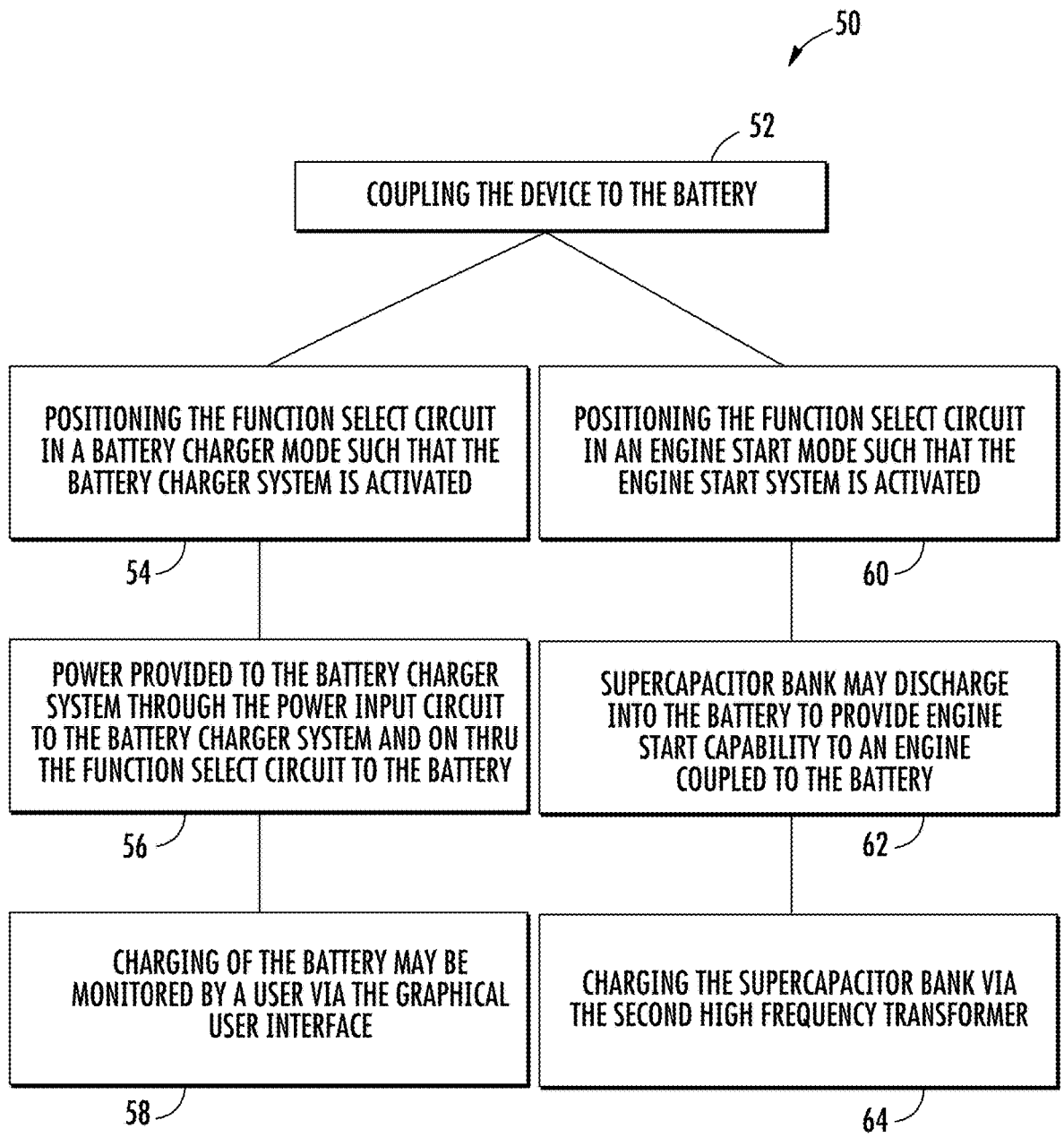
FIG. 3 is a flow diagram of a method of using high frequency battery charging device.

As shown in FIGS. 1-3, a high frequency battery charging device 10 including a battery charger system 12 and an engine start system 14 is disclosed. In at least one embodiment, the high frequency battery charging device 10 may include a battery charger system 12 formed from a first high frequency transformer 16 configured to charge a battery 18, and may include an engine start system 14 formed from a second high frequency transformer 20 configured to charge a supercapacitor bank 22, which in turn is configured to start and engine coupled to a battery 18. The high frequency battery charging device 10 may be configured to be coupled to a battery 18. In at least one embodiment, the high frequency battery charging device 10 may be configured to be coupled to a battery 18 positioned within a vehicle 40, such as, but not limited to being an automobile, vessel, airplane, all-terrain vehicle, utility vehicle, personal watercraft and the like. The high frequency battery charging device 10 may be coupled to the battery 18 with the high frequency battery charging device 10 being positioned outside of the battery 10.

In at least one embodiment, the high frequency battery charging device 10 may include a first high frequency transformer 16 configured to charge a battery 18 and a second high frequency transformer 20 configured to charge a supercapacitor bank 22. The supercapacitor bank 22 may be in communication with the second high frequency transformer 20 and configured to provide an engine start function to an engine coupled to a battery 18 to which the high frequency battery charging device 10 is coupled. In at least one embodiment, the supercapacitor bank 22 may be, but is not limited to being, a plurality of capacitors connected in series and/or parallel to provide adequate voltage/current to a battery 18. The supercapacitor bank 22 may include circuitry to equalize voltages on each capacitor. In at least one embodiment, the supercapacitor bank 22 may be formed from electric double-layer capacitors (EDLCs). Supercapacitors with a low equivalent series resistance (ESR) may be used to provide a high peak current necessary for engine starting. The supercapacitor bank 22 may be constructed so an interconnect or bus bar is made of low resistance material such as cooper to minimize the resistance connection in between the super capacitors. In addition, and depending on the configuration, a supercapacitor may be screwed onto the bus bar or may be soldered to the bus bar, which provides rigidity in case the supercapacitor bank 22 is subjected to significant shock and vibration.

The high frequency battery charging device 10 may be configured to be coupled to a battery 18. In at least one embodiment, the high frequency battery charging device 10 may be configured to be coupled to a battery 18 positioned within a vehicle, such as, but not limited to being an automobile, vessel, airplane, all-terrain vehicle, utility vehicle, personal watercraft and the like. The high frequency battery charging device 10 may not be incorporated within the battery 18. Instead, the high frequency battery charging device 10 may be coupled to the battery 18 with the high frequency battery charging device 10 being positioned outside of the battery 18. The high frequency battery charging device 10 may be coupled to the battery 18 via a positive lead 24 and a negative lead 26. The high frequency battery charging device 10 may be removably or permanently coupled to the battery 18. In at least one embodiment, the first high frequency transformer 16 may be configured to charge a 12 volt vehicle battery. In other embodiments, the first high frequency transformer 16 may be configured to charge a batteries having design voltages other than 12 volts. The first high frequency transformer 16 may also be configured to charge different battery types, including but not limited to, lead batteries, gel batteries and absorbent glass mat (AGM) batteries. In at least one embodiment, the first high frequency transformer 16 and the second high frequency transformer 20 may be configured to operate at the same frequency.

The first high frequency transformer 16 and the second high frequency transformer 20 may be any appropriate transformer. In at least one embodiment, the first or second high frequency transformer 16, 20, or both, may be configured to operate at a frequency greater than 20 kHz to prevent audible noise. The first or second high frequency transformer 16, 20, or both, may be constructed from E-I, E-E U-I core shapes. The first or second high frequency transformer 16, 20, or both, may be formed from a core material chosen to be suitable for the selected switching frequency.

The high frequency battery charging device 10 may include a function select circuit 28 configured to direct power from the first high frequency transformer 16, which is a battery charger system, or the second high frequency transformer 20, which is an engine start system, to the battery 18. Thus, the function select circuit 28 essentially controls the mode of operation of the high frequency battery charging device 10. The high frequency battery charging device 10 may include a power input circuit 30 configured to rectify and filter incoming alternating current power to direct current power to supply to the first and second high frequency transformers. The high frequency battery charging device 10 may include a rectifier filter circuit 32 positioned downstream from and in communication with the first high frequency transformer 16 and upstream from and in communication with the function select circuit 28 for converting direct current power emitted from the first high frequency transformer 16 as alternating current power to direct current power to be supplied to the battery 18 via the function select circuit 28. During operation, power is provided to the device 10 via a power source 42, such as, but not limited to being, a generator, a municipal power source and any other appropriate power sources. The power is first received as direct current by the first high frequency transformer 16 and converted to alternating current when passing through a primary winding within the first high frequency transformer 16.

The high frequency battery charging device 10 may include a rectifier filter circuit 34 positioned downstream from and in communication with the second high frequency transformer 20 and upstream from and in communication with the supercapacitor bank 22 and the function select circuit 28. The rectifier filter circuit 34 may receive alternating current power from the second high frequency transformer 20, convert the alternating current power to direct current power and pass the direct current power to the supercapacitor bank 22. The function select circuit 28 may be positioned downstream of the supercapacitor bank 22 for directing direct current power emitted from the supercapacitor bank 22 to the battery 18 via the function select circuit 28. During operation, the power is first received as direct current by the second high frequency transformer 20 and converted to alternating current when passing through a primary winding within the second high frequency transformer 20. The engine start circuit 14 may operate by discharging power from the supercapacitor bank 22 to the battery 18 via the function select circuit 28.

The high frequency battery charging device 10 may include a control circuit 36 configured to control operation of a battery charger system 12, an engine start system 14 and the function select circuit 28. In at least one embodiment, the control circuit 36 may be programmable.

The high frequency battery charging device 10 may include a graphical user interface 38 configured to enable a user to control the device 10. The graphical user interface 38 may be configured such that a user may select a mode of operation. The graphical user interface 38 may be used to provide visual feedback to the user. The graphical user interface 38 may be any appropriate interface capable of providing a visual display to a user and enabling the user to control the device 10 based on information provided to the user via the graphical user interface 38. The graphical user interface 38 may be, but is not limited to being, a digital screen, touch screen and the like. The graphical user interface 38 may be connected to a user interface 44 that enables the user to control the device 10. The graphical user interface 38, the user interface 44 and other elements of the device 10 may be contained in one or more housings 46. The housing 46 may be portable. The graphical user interface 38 and the user interface 44 may be visible outside of the housing 46 and accessible to a user.

As shown in FIG. 3, the method 50 of using the high frequency battery charging device 10 may include coupling the device 10 to the battery 18 at step 52. In at least one embodiment, coupling the device 10 to the battery 18 may include coupling the positive and negative leads to the positive and negative posts, respectively, of the battery 18. The method 50 may include positioning the function select circuit 28 in a battery charge mode such that the battery charger system 12 is activated at step 54. Power may be provided to the battery charger system 12 through the power input circuit 30 to the battery charger system 12 and on thru the function select circuit 28 to the battery 18 at step 56. The charging of the battery may be monitored by a user via the graphical user interface 38 at step 58.

The method 50 may include positioning the function select circuit 28 in an engine start mode such that the engine start system 14 is activated at step 60. The supercapacitor bank 22 may discharge into the battery 18 to provide engine start capability to an engine coupled to the battery 18 at step 62. When power is discharged from the supercapacitor bank 22 to the battery 18, the power flows from the supercapacitor bank 22, thru the function select circuit 28 to the battery 18. Once the engine has been started, the second high frequency transformer 20 charges the supercapacitor bank 22 at step 64 with power provided to the device 10 via the power source 42. Power may be provided to the engine start system 14 through the power input circuit 30 to the second high frequency transformer 20 to charge the supercapacitor bank 22 of the engine start system 14.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A high frequency battery charging device comprising:
 a first high frequency transformer configured to charge a vehicle battery;
 a second high frequency transformer configured to charge a supercapacitor bank;
 wherein the supercapacitor bank is in communication with the second high frequency transformer and is configured to provide an engine start function to an engine coupled to the vehicle battery to which the high frequency battery charging device is coupled;
 a power input circuit configured to rectify and filter incoming alternating current power to direct current power to supply to the first and second high frequency transformers;
 a rectifier filter circuit positioned downstream from and in communication with the first high frequency transformer and upstream from and in communication with a function select circuit for converting direct current power emitted from the first high frequency transformer as alternating current power to direct current power to be supplied to the vehicle battery via the function select circuit; and
 a rectifier filter circuit positioned downstream from and in communication with the second high frequency transformer and upstream from and in communication with the supercapacitor bank, and the function select circuit configured to receive direct current power from the supercapacitor bank and to direct the direct current power to the vehicle battery.

2. The high frequency battery charging device of claim 1, wherein the first high frequency transformer configured to charge a 12 volt vehicle battery.

3. The high frequency battery charging device of claim 1, wherein the first high frequency transformer and the second high frequency transformer are configured to operate at the same frequency.

4. The high frequency battery charging device of claim 1, a wherein the function select circuit is configured to direct power from the first high frequency transformer, which is a battery charger system, or the second high frequency transformer, which is an engine start system, to the vehicle battery.

5. The high frequency battery charging device of claim 1, further comprising a control circuit configured to control operation of a battery charger system, an engine start system and the function select circuit.

6. The high frequency battery charging device of claim 5, wherein the control circuit is programmable.

7. The high frequency battery charging device of claim 1, further comprising a graphical user interface configured to enable a user to control the device.

8. A high frequency battery charging device comprising:
 a first high frequency transformer configured to charge a vehicle battery;
 a second high frequency transformer configured to charge a supercapacitor bank;
 wherein the supercapacitor bank is in communication with the second high frequency transformer and is configured to provide an engine start function to an engine coupled to the vehicle battery to which the high frequency battery charging device is coupled;
 wherein the high frequency battery charging device is removably coupled to the vehicle battery;
 wherein the first high frequency transformer and the second high frequency transformer are configured to operate at the same frequency;
 a power input circuit configured to rectify and filter incoming alternating current power to direct current power to supply to the first and second high frequency transformers;
 a rectifier filter circuit positioned downstream from and in communication with the first high frequency transformer and upstream from and in communication with a function select circuit for converting direct current power emitted from the first high frequency transformer as alternating current power to direct current power to be supplied to the vehicle battery via the function select circuit; and a rectifier filter circuit positioned downstream from and in communication with the second high frequency transformer and upstream from and in communication with the supercapacitor bank and a function select circuit configured to receive direct current power from the supercapacitor bank and to direct the direct current power to the vehicle battery.

9. The high frequency battery charging device of claim 8, wherein the first high frequency transformer configured to charge a 12 volt vehicle battery.

10. The high frequency battery charging device of claim 8, wherein the function select circuit configured to direct power from the first high frequency transformer, which is a battery charger system, or the second high frequency transformer, which is an engine start system, to the vehicle battery.

11. The high frequency battery charging device of claim 8, further comprising a control circuit configured to control operation of a battery charger system, an engine start system and the function select circuit.

12. The high frequency battery charging device of claim 11, wherein the control circuit is programmable.

13. The high frequency battery charging device of claim 8, further comprising a graphical user interface configured to enable a user to control the device.

14. A high frequency battery charging device comprising:
a first high frequency transformer configured to charge a vehicle battery;
a second high frequency transformer configured to charge a supercapacitor bank;
wherein the supercapacitor bank is in communication with the second high frequency transformer and is configured to provide an engine start function to an engine coupled to a vehicle battery to which the high frequency battery charging device is coupled;

wherein the first high frequency transformer and the second high frequency transformer are configured to operate at the same frequency;

a control circuit configured to control operation of a battery charger system, an engine start system and a function select circuit;

a graphical user interface configured to enable a user to control the device;

a power input circuit configured to rectify and filter incoming alternating current power to direct current power to supply to the first and second high frequency transformers;

a rectifier filter circuit positioned downstream from and in communication with the first high frequency transformer and upstream from and in communication with the function select circuit for converting direct current power emitted from the first high frequency transformer as alternating current power to direct current power to be supplied to the vehicle battery via the function select circuit; and a rectifier filter circuit positioned downstream from and in communication with the second high frequency transformer and upstream from and in communication with the supercapacitor bank, and the function select circuit configured to receive direct current power from the supercapacitor bank and to direct the direct current power to the vehicle battery.

15. The high frequency battery charging device of claim 14, wherein the first high frequency transformer configured to charge a 12 volt vehicle battery.

16. The high frequency battery charging device of claim 14, wherein the first high frequency transformer and the second high frequency transformer are configured to operate at the same frequency.

17. The high frequency battery charging device of claim 14, wherein the function select circuit is configured to direct power from the first high frequency transformer, which is a battery charger system, or the second high frequency transformer, which is an engine start system, to the vehicle battery.

18. The high frequency battery charging device of claim 14, wherein the control circuit is programmable.

\* \* \* \* \*